Figure 14:
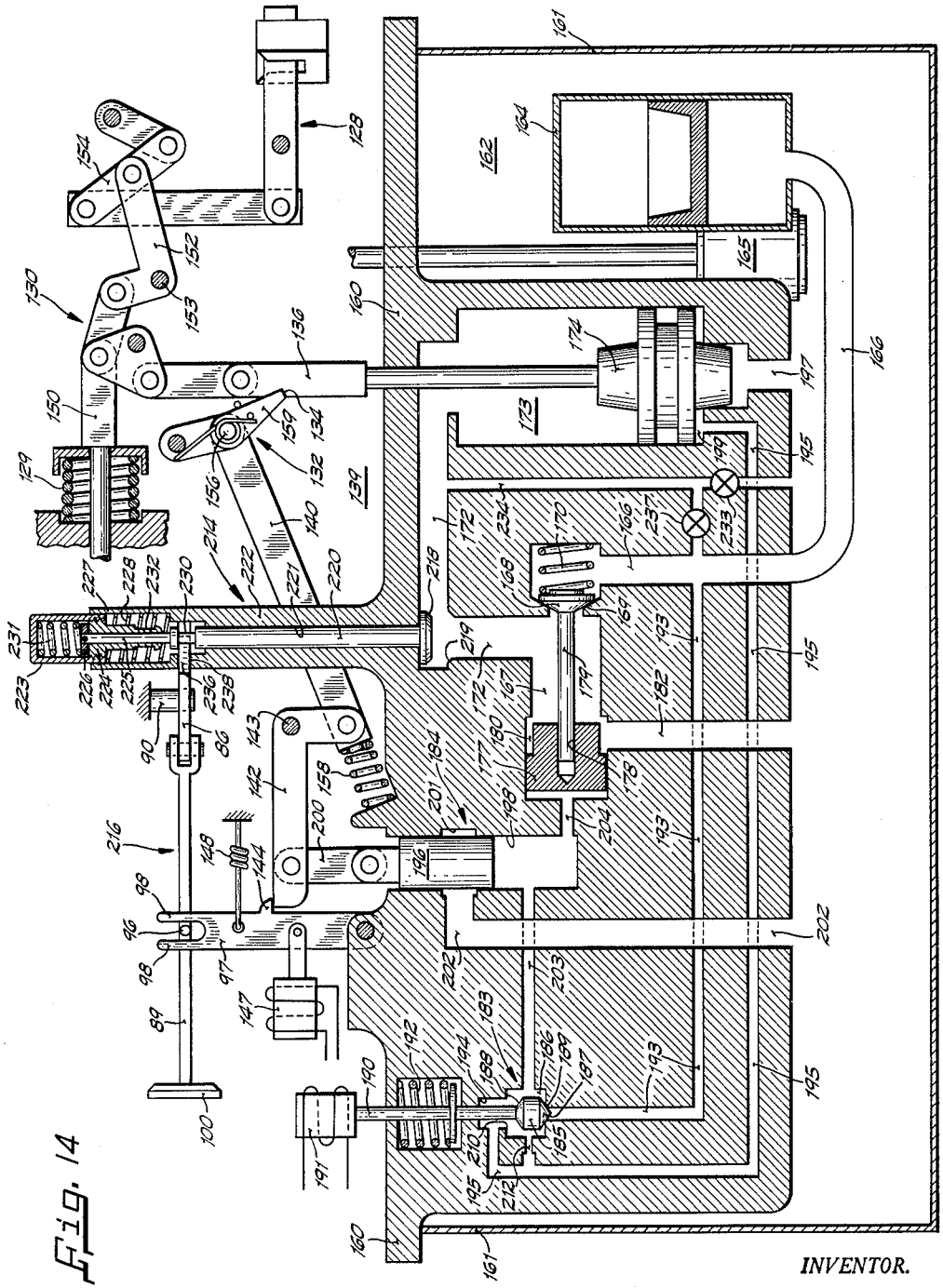

Nov. 23, 1965  D. M. UMPHREY  3,219,771
METAL ENCLOSED SWITCHGEAR
Filed Aug. 28, 1961  6 Sheets-Sheet 1
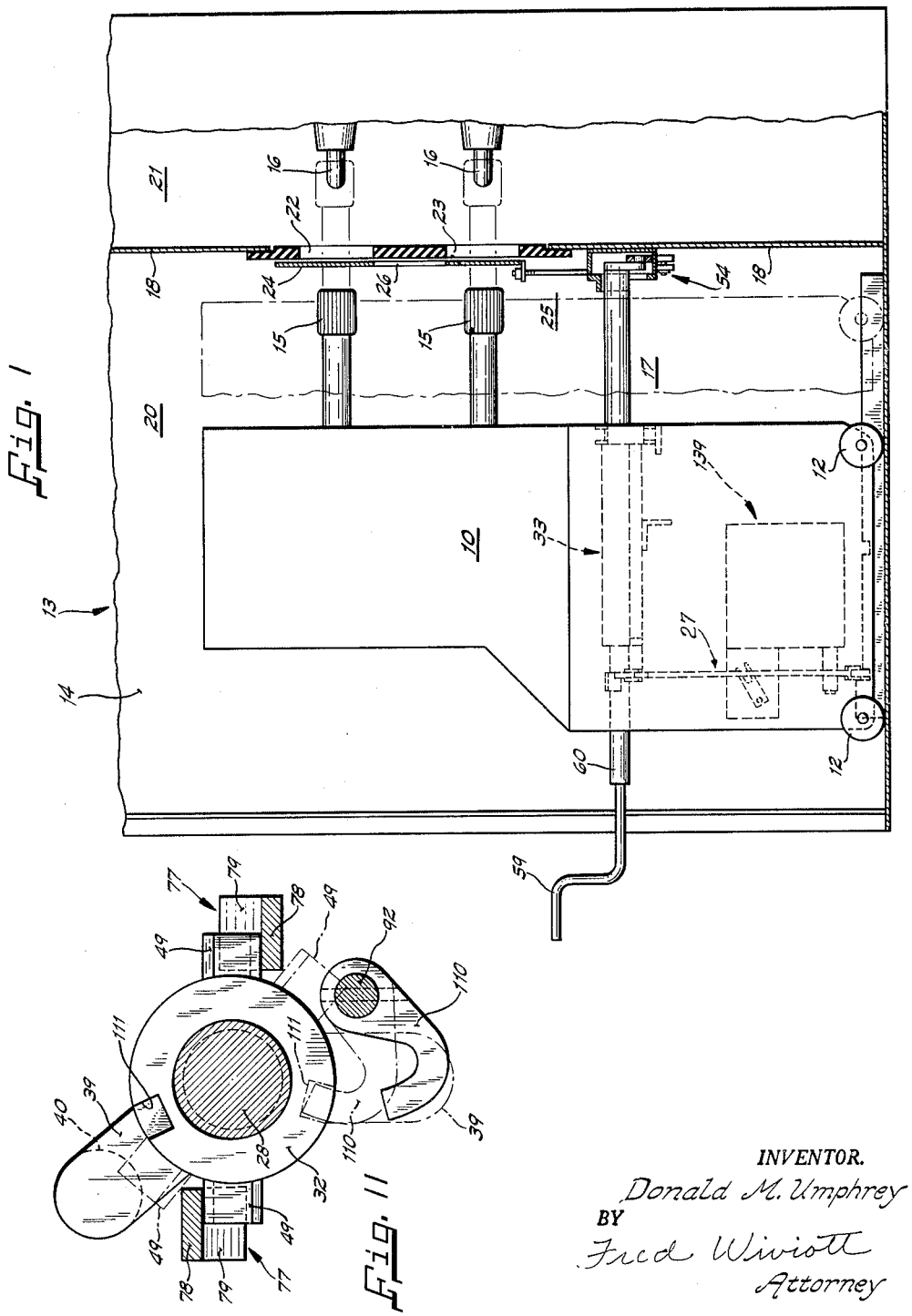
INVENTOR.
Donald M. Umphrey
BY
Fred Wiviott
Attorney Nov. 23, 1965     D. M. UMPHREY     3,219,771
METAL ENCLOSED SWITCHGEAR
Filed Aug. 28, 1961     6 Sheets-Sheet 2
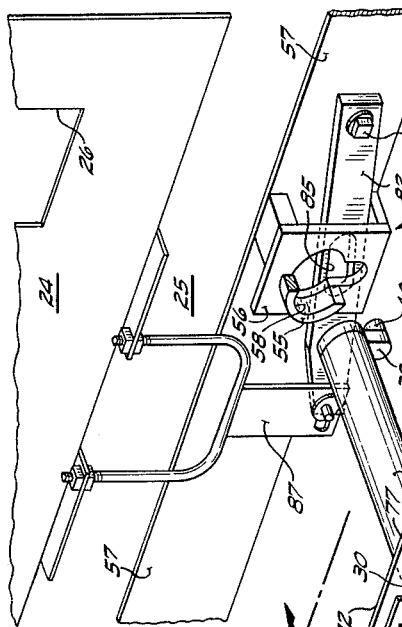
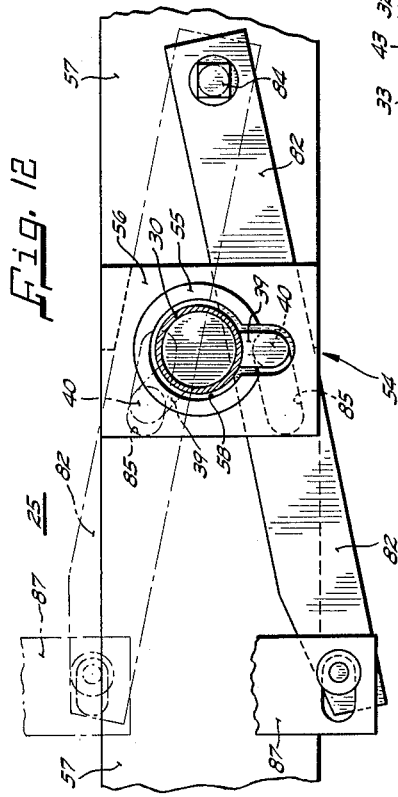
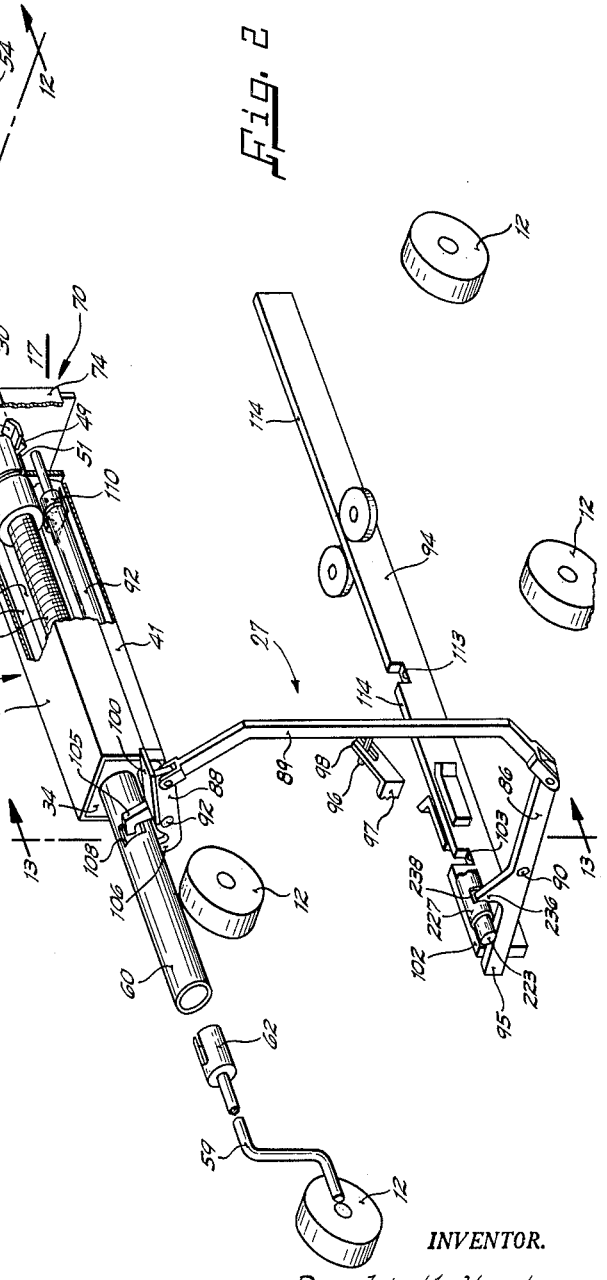
INVENTOR.
Donald M. Umphrey
BY Fred Wiviott
Attorney Nov. 23, 1965　　　　D. M. UMPHREY　　　　3,219,771
METAL ENCLOSED SWITCHGEAR
Filed Aug. 28, 1961　　　　　　　　　　　　　6 Sheets-Sheet 3
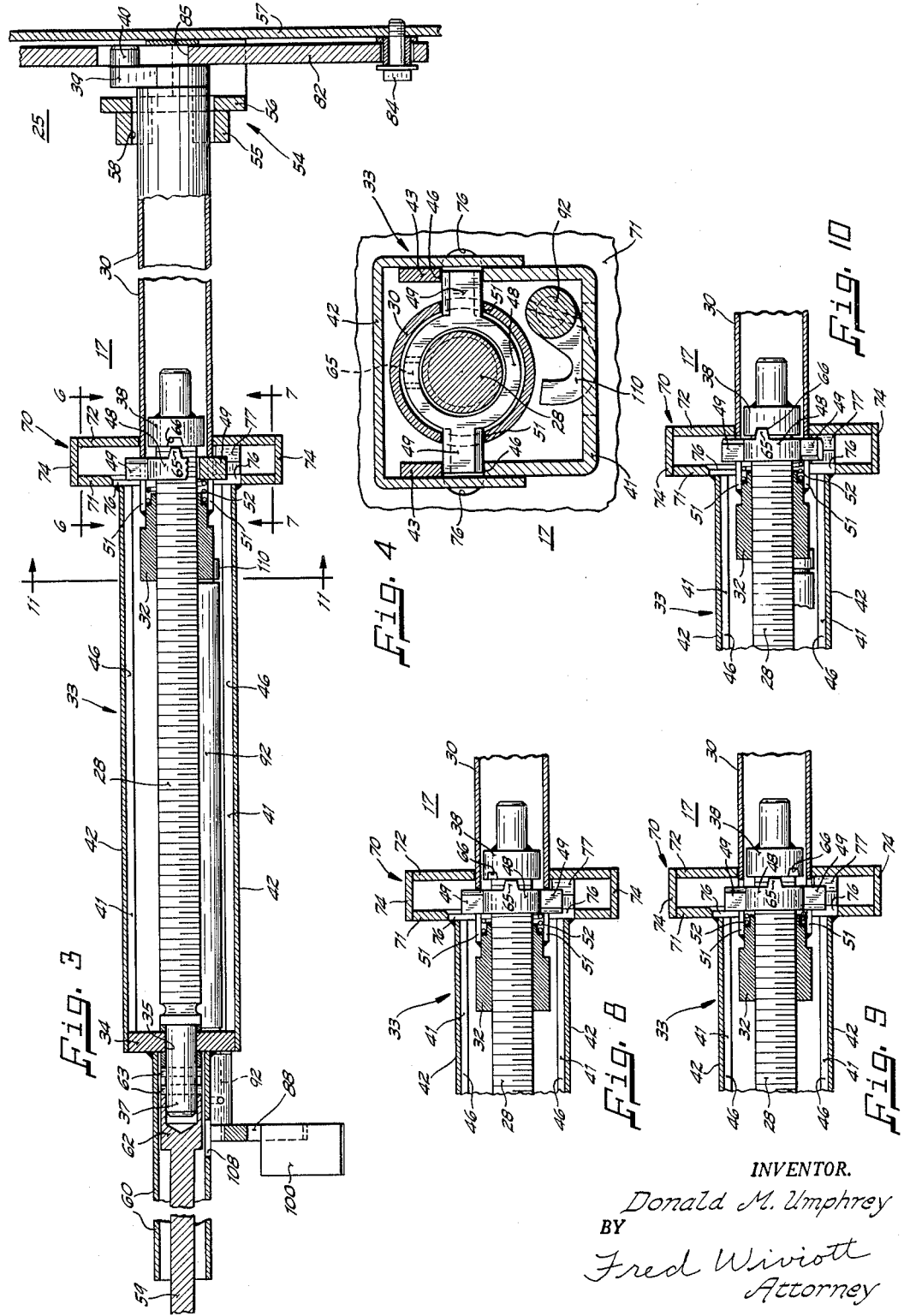
INVENTOR.
Donald M. Umphrey
BY
Fred Wiviott
Attorney

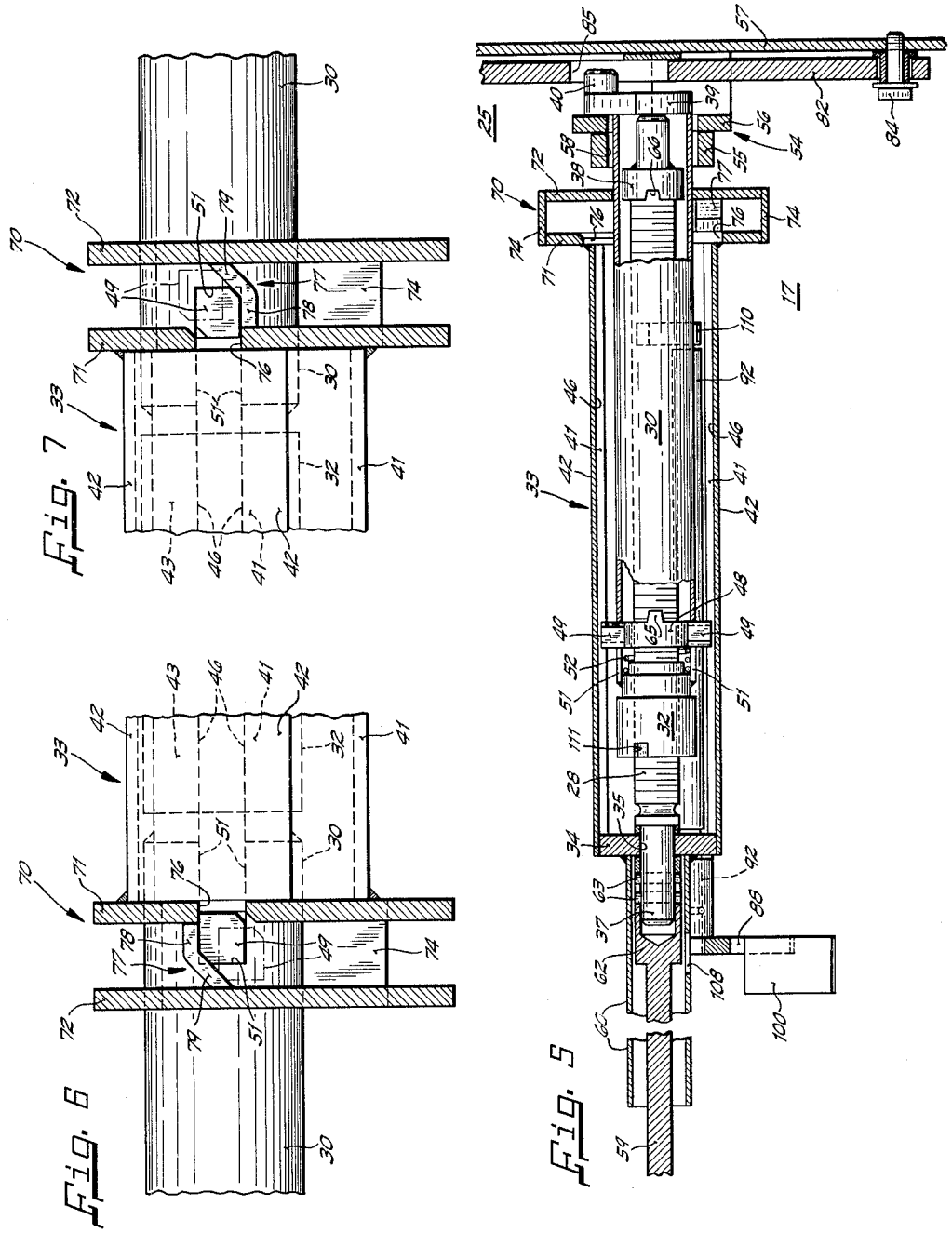

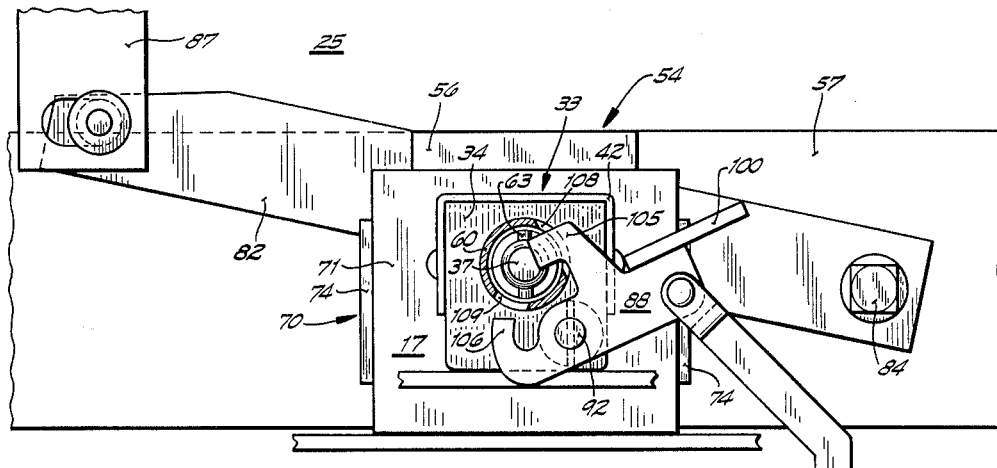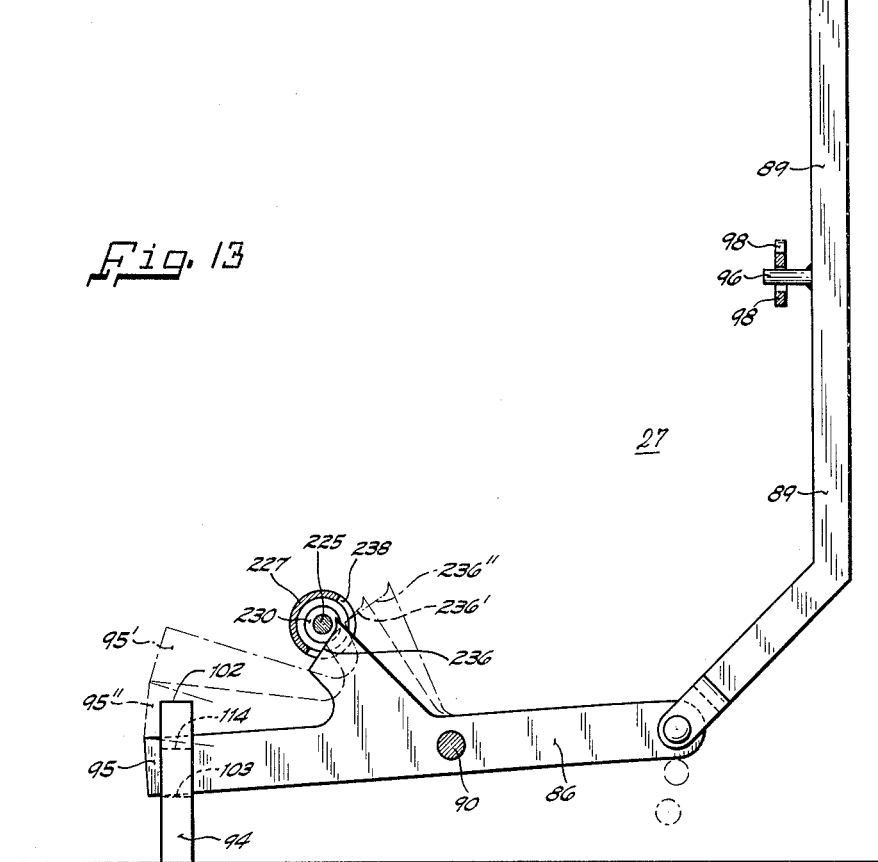

Nov. 23, 1965  D. M. UMPHREY  3,219,771
METAL ENCLOSED SWITCHGEAR
Filed Aug. 28, 1961  6 Sheets-Sheet 6

INVENTOR.
Donald M. Umphrey
BY
Fred Wiviott
Attorney

United States Patent Office 3,219,771
Patented Nov. 23, 1965

3,219,771
METAL ENCLOSED SWITCHGEAR
Donald M. Umphrey, Palo Alto, Calif., assignor to McGraw-Edison Company, Milwaukee, Wis., a corporation of Delaware
Filed Aug. 28, 1961, Ser. No. 134,288
18 Claims. (Cl. 200—50)

This invention relates to circuit breakers and, more particularly, to draw-out mechanism for metal enclosed switchgear assemblies.

In metal enclosed switchgear of the draw-out type, the circuit breaker unit carries movable disconnect contacts and is operatively mounted for horizontal movement between connected, test and disconnected positions with respect to stationary circuit and bus bar structure disposed in the rear of a grounded metal enclosure. The enclosure has stationary disconnect contacts that are cooperatively engageable by the movable contacts and which are electrically connected to the bus bar structure. In addition, the circuit breaker is provided with a draw-out mechanism for moving it between its various positions. In general, such switchgear also includes an interlocking mechanism to prevent the circuit breaker from being moved relative to the enclosure while the interrupting contacts are closed. The latter is provided because the disconnect contacts are generally not designed to withstand the arcing associated with the opening or closing of an electric circuit under load.

In order to protect operating personnel from the high voltages carried by the stationary contacts and bus bar structure, they are usually disposed behind a sheet metal wall near the rear of the enclosure. The movable disconnect contacts are mounted at the rear of the circuit breaker and are movable through apertures in the sheet metal protective wall. To completely isolate the bus bar structure from the interior of the compartment when the circuit breaker is out of its connected position, a shutter assembly for closing the apertures is provided. A shutter interlock assembly connected to the draw-out mechanism opens the shutters when the circuit breaker is in position to be drawn into the enclosure and recloses the shutter before the circuit breaker can be removed from the enclosure.

It is an object of the invention to provide a new and improved draw-out mechanism for metal enclosed switchgear.

Another object of the invention is to provide a shutter interlock assembly for draw-out type switchgear which closes the stationary disconnect contact shutters before the circuit breaker can be removed from its compartment and which reopens the shutter assembly before a draw-in operation of the circuit breaker can commence. A further object is to provide such a shutter assembly which does not require movement of the circuit breaker for operation.

Yet another object of the invention is to provide an interlock assembly for use with draw-out type switchgear which prevents movement of the circuit breaker unit into or out of its connected position when its interrupting contacts are closed.

A further object of the invention is to provide an interlock assembly for use with a circuit breaker unit having a manually operable means for initiating retarded operation for purposes of maintenance or inspection wherein interlock means are provided for preventing such retarded operation when said circuit breaker unit is out of its test or disconnected positions.

These and other objects and advantages of the instant invention will become more apparent from the detailed description of the instant invention taken with the accompanying drawings in which:

FIG. 1 is a side elevational view, with parts broken away, of a metal enclosed circuit breaker unit incorporating the instant invention; FIG. 2 is a perspective view of the draw-out and racking mechanism according to the instant invention; FIGS. 3, 5, 8, 9 and 10 illustrate the draw-out mechanism in its various positions; FIG. 4 is a view taken along lines 4—4 of FIG. 3; FIG. 6 is a view taken along lines 6—6 of FIG. 3; FIG. 7 is a view taken along lines 7—7 of FIG. 3; FIG. 11 is a view taken along lines 11—11 of FIG. 3; FIG. 12 is a view taken along lines 12—12 of FIG. 2; FIG. 13 is a view taken along lines 13—13 of FIG. 2, and FIG. 14 schematically illustrates the operating mechanism of the circuit breaker depicted in FIG. 1.

In general terms, the invention comprises, according to one of its aspects, a draw-out mechanism for metal enclosed switchgear wherein a first means is rotatably mounted on a switchgear unit and drive means cooperatively engages the first means for reversible, uniformly advancing movement as the first means rotates. The drive means is releasably connectable to the enclosure so that the circuit breaker unit is moved inwardly or outwardly of the enclosure as the first means rotates. The drive means is movable into or out of engagement with the enclosure when the switchgear unit reaches the outward extremity of its movement by the draw-out means.

According to another of its aspects, the invention comprises a draw-out switchgear assembly having a selectively engageable operating member for initiating a draw-out operation wherein interlock means prevents the engagement of said operating member when the switchgear's main interrupting contacts are closed. A second interlock means may also be provided to prevent the closure of the main interrupting contacts when the circuit breaker unit is being moved between its various positions relative to its enclosure.

According to yet another aspect of the invention, a hydraulically operated circuit breaker having valve means for operating the circuit breaker independently of its hydraulic operating mechanism and at a reduced rate of speed is provided with interlock means for preventing the operation of the valve means when the circuit breaker's main interrupting contacts are closed. The interlock means may also be operable to prevent operation of the valve means when the circuit breaker unit is out of its test or disconnected positions.

According to a still further one of its aspects, the invention comprises a draw-out switchgear assembly having shutter means operable to isolate its stationary disconnect contacts and draw-out means releasably connectable to the enclosure for moving the circuit breaker unit inwardly or outwardly thereof. Interlock means are also provided to open the shutter means upon the initiation of a draw-in operation and for closing the same after the completion of a draw-out operation.

Referring now to the drawings in greater detail, FIG. 1 shows a movable circuit breaker unit indicated generally by the reference numeral 10 and which is mounted on rollers 12 for movement into and out of an enclosure 13 formed of sheet metal walls 14. The circuit breaker unit 10 also carries movable disconnect contacts 15 which are engageable with stationary disconnect contacts 16 disposed in the rear of the enclosure 13 and draw-out mechanism 17 for moving the circuit breaker unit 10 into and out of a connected position relative to said stationary disconnect contacts.

A vertical panel 18 divides the enclosure 13 into a front compartment 20 for housing the circuit breaker unit 10 and a rear compartment 21 in which the stationary disconnect contacts 16 are disposed. A plurality of apertures 22 and 23 are provided in the panel 18 to permit access to the rear compartment 21 by the movable disconnect contacts 15. A shutter plate 24 is provided to cover the apertures 22 and 23 when the circuit breaker unit 10 is out of the front compartment 20. This protects operating personnel from the high voltages carried by the stationary disconnect contacts 16.

A first interlock mechanism 25, which will be described in greater detail hereinbelow, couples the shutter plate 24 to the draw-out mechanism 17 and is operable to move the apertures 26 in the shutter plate 24 into registry with the apertures 22 and the lower end of the plate 24 above apertures 23 in the panel 18. As a result, when the mechanism 17 is placed in a position where it can draw the circuit breaker unit 10 from its test to its connected position, the interlock mechanism 25 will move the shutter plate 24 upwardly to allow free movement of the movable disconnect contacts 15 into engagement with the stationary disconnect contacts 16. Conversely, when the draw-out mechanism 17 is placed in a position where the circuit breaker unit 10 can be removed from the compartment 20, the shutter interlock assembly will move the shutter downwardly to cover the apertures 23.

A second interlock mechanism 27 is also provided to prevent operation of the draw out mechanism 17 unless the circuit breaker's main interrupting contacts are open and also to prevent closure of said contacts when the circuit breaker unit 10 is between positions.

Referring now to FIGS. 2 and 3, the draw-out mechanism 17 is shown to be of the screw type and generally to include a driving screw 28 affixed to the circuit breaker unit 10, a drive tube 30 constructed and arranged to be releasably securable to the divider panel 18, and a nut 32 affixed to the drive tube and threadably engaging the drive screw 28. When the drive tube 30 is in its secured position, rotation of screw 28 will draw the circuit breaker inwardly or force it outwardly of the compartment 20 depending upon the direction of rotation.

More specifically, a housing 33 is affixed to circuit breaker 10 and includes an end wall 34 having an aperture 35 which forms a bearing for the unthreaded end 37 of the drive screw 28. In addition, an annular guide member 38 is affixed to the opposite end of the drive screw 28 and is disposed within the drive tube 30. The nut 32 threadably engages the driving screw 28 and is affixed to the left end of the drive tube 30, as viewed in FIG. 4 so that rotation of the drive screw 28 will cause the nut 32 to travel longitudinally therealong and thereby telescope the drive tube 30 into and out of the housing 33. A key 39 extends laterally from the opposite end of the drive tube 30 and has a bearing tip 40 affixed to its outer end.

As seen in FIG. 4, the housing 33 is fabricated from a pair of overlapping U-in-cross section channel members 41 and 42. In addition, a pair of metallic strips 43 are affixed longitudinally along each of the lateral sides of the upper channel member 42 and each is spaced a predetermined distance from each of the upper ends of the overlapped lower channel member 41. This provides a longitudinal track 46 along each side of the housing 33. An annular lock member 48, illustrated in FIGS. 3 and 4, loosely surrounds the driving screw 28 between the nut 32 and the guide member 38. An ear 49 extends from each of the lateral sides of the member 48 and through a slot 51 formed in each side of the drive tube 30. A spring 52 disposed between the nut 32 and the lock member 48 normally forces said member to bear against the front end of the slots 51.

A draw-in housing 54, shown in FIGS. 2, 3 and 5, is affixed to the divider panel 18 and comprises a pair of rigidly connected front and rear plates 56 and 57, respectively. The front plate 56 has a keyhole shaped aperture 58 formed therein for receiving the end of the drive tube 30 and the driving key 39 therethrough. In addition, a guide sleeve 55 is affixed to the front plate 56 and around the circular portion of the aperture 58 to guide the drive tube 30 into and out of the housing 54.

The housing 33 terminates at its right end, as viewed in FIG. 3, in a housing 70 consisting of a pair of plates 71 and 72 which are maintained in spaced relation by side plates 74. Each of the plates 71 and 72 are apertured to slidably receive the drive tube 30. In addition, the aperture in the end plate 71 has a pair of laterally extending recesses 76 in registry with the channels 46 for allowing the lock plate 48 and its ears 49 to pass into the space between the plates 71 and 72. Opposite each of the recesses 76 is a cam 77, shown in greater particularity in FIGS. 6 and 7, and which extends between the end plates 71 and 72. The cams 77 are oppositely oriented and each has a linear portion 78 in registry with one edge of the slot 46 and an inclined portion 79 extending toward the plate 72.

When the circuit breaker 10 is in its connected position relative to the stationary disconnect contacts 16, the draw-out mechanism is in the position indicated in FIG. 5.

More specifically, the nut 32 is at the left end of the screw 28 and the drive tube 30 is telescoped within the housing 33. In order to move the circuit breaker 10 out of its connected position, the second interlock mechanism 27 is operated in the manner to be described more fully below, and then a crank 59 is inserted into a guide tube 60 extending axially from the end of the housing 33 and affixed to the end plate 34. The slotted head 62 on the end of the crank 59 engages a pair of drive pins 63 extending transversely through the unthreaded end 37 of the screw 28 which may then be rotated.

The nut 32, which is affixed to the drive tube 30, is prevented from rotating with the drive screw 28 because the ears 49 of the lock member 48 extend through the slots 51 in the drive tube 30 and into the tracks 46 on the housing 33. As a result, axial relative movement occurs between the nut 32 and the screw 28 as the drive tube 30 is telescoped out of the housing 33. Because of the engagement between the bearing tip 40 and the rear wall 57 of the draw-in housing 54, movement of the drive tube 30 toward the right is prevented. Thus, as the drive screw 28 rotates, the housing 33 and the circuit breaker 10 to which it is rigidly affixed are moved toward the left as viewed in FIG. 5 and outwardly of the cubicle 13. As drive screw 28 continues to rotate, the guide member affixed to its righthand end approaches the lock member 48.

Just prior to the point where the circuit breaker 10 reaches its test position, the draw-out mechanism 17 is in the position shown in FIG. 3 wherein a tongue 65 extending from the front face of the lock member 48 is just opposite and spaced slightly from a radial groove 66 formed in the rear surface of the guide member 38. Because the guide member is affixed to the screw 28 and turns therewith while rotation of the lock member 48 is prevented, further rotation of the screw 28 will cause the tongue 65 to engage the rear surface of the guide member 38 just after the slot 66 moves past registry therewith, as shown in FIG. 8. As a result of this engagement, the lock member 48 will be carried toward the left along with the housing 33 and the guide member 38 while the nut 32 remains stationary. This compresses a spring 52 surrounding the nut 32 and bearing against the rear of the lock member 48. Also, rotation of the lock member 48 revolves the radial slot 66 to the point where it is adjacent the opposite side of the tongue 65, as seen in FIG. 9. Further rotation of the screw 28 will rotate the guide member 38 into registry with the tongue 65 whereupon the spring 52 will be free to snap the lock member 48 sharply to the right, to its position shown in FIG. 10. As a result, a rigid driving connection is effected between the screw 28 and the lock member 48 through the guide member 66. In addition, the ears 49 on the lock member 48 move into a housing 70 and out of engagement with the tracks 46. Since the ears 49 remain in engagement with the slots 51 in the tube 30, however, further rotation of the screw 28 will rotate the lock member 48 in the housing 70 and thereby rotate the nut 32 and the drive tube 30.

As the tongue 65 snaps into the groove 66, the ears 49 pass through the enlargements 76 and along the linear portions 78 of the cams 77 and into engagement with the inclined portions thereof. The ears 49 then travel along the inclined portions of cams 77 to impart a slight clockwise rotation to the lock plate 48 as well as the nut 32 on the guide member 38. This moves the ears 48 from their full positions in FIGS. 6 and 7 to their position shown by phantom lines. Further rotation of the screw 28 will then rotate the lock plate 48 on the drive tube 30 through a counterclockwise angle of approximately 140°. This action can be seen more clearly in FIG. 11 wherein the position of the ears 49 and the key 39 prior to rotation thereof are shown by full lines. As the lock plate 48 and the drive tube 30 rotate, the ears 49 will rotate counterclockwise until they strike the opposite side of the cam members 77 whereupon further rotation is prevented. This moves the key member 39 from its position shown by full lines to its phantom position wherein it is in registry with the aperture 58 so that it may be removed from draw-in housing 54. Thus, the key 39 no longer prevents removal of circuit breaker 10 from its test position shown by full lines in FIG. 1 to a position external of the cubicle 13.

When it is desired to move the circuit breaker 10 from its test position to its connected position, the screw 28 is rotated in a counterclockwise direction, as viewed in FIG. 11, thereby moving the key 39 from its phantom position to its full position whereupon it is out of registry with the aperture 58 in the front plate 56 of the draw-in housing 54. This also rotates the lock member 48, to move its ears 49 from their phantom positions. As the lock member 48 rotates, ears 49 will first engage the oblique portions 79 of the cams 77 so that they move from their phantom positions in FIGS. 6 and 7 to their full position which imparts a sharp rearward motion to the lock plate 48. This moves tongue 65 out of engagement with the groove 66 and also forces the ears 49 onto the tracks 46 as seen in FIG. 3. Also, the driving connection between the lock plate 48 and the guide member 38 is interrupted and the nut 32 and drive tube 30 are prevented from rotating. As a result, the reaction between the key 39 on the front plate 56 as the screw 28 continues to rotate will cause the housing 33, and the circuit breaker rigidly connected to it, to be moved toward the right as viewed in FIGS. 1 and 3.

Referring now to FIGS. 2, 3 and 12, the shutter assembly 24 is shown connected to the draw-out mechanism 17 by means of the first interlock assembly 25 which includes a slotted link 82 pivotally mounted on the plate 57 by a pin 84 and having a longitudinal slot 85 intermediate its ends. When the circuit breaker unit 10 is rolled into its test position, the bearing tip 40 on the key member 39 will move into the slot 85 thereby coupling the lever 82 to the drive tube 30. When the drive tube is rotated in a clockwise direction as viewed in FIGS. 2 and 12, the bearing tip 40 acting in the slot 85 will rotate the lever 82 clockwise to force the shutter 24 upwardly in its support frame 86 through the agency of a bifurcated connecting link 87. Conversely, when the draw-out mechanism 17 has moved the circuit breaker unit from its connected to its test position and the key 39 is rotated into registry with the aperture 58, the lever 82 will be rotated through a slight counterclockwise angle from its phantom position in FIG. 12 to its full position whereupon the shutter 24 will be closed. It can be seen, therefore, that because the key 39 must be rotated in a first direction prior to the movement of the circuit breaker unit toward its connected position and because this movement opens the shutter 24, the shutter 24 will always be in open position to receive the movable disconnect contacts 15 when the circuit breaker is being moved toward its connected position. On the other hand, because the key 39 must be rotated in the opposite direction before it can be moved out of the housing 54, the shutter 24 must be closed before the circuit breaker 10 can be moved out of the compartment 13. Also, this opening and reclosing of the shutter 24 takes place while the circuit breaker 10 is at rest.

The second interlock mechanism 27 is provided to prevent movement of the circuit breaker into or out of its connected position when its interrupting contacts are closed. This assembly, seen in FIGS. 2 and 13, includes an interlock lever 86 and a blocking lever 88 interconnected by a long link 89. The interlock lever 86 is pivotally connected at 90 on the circuit breaker 10 near its rear portion and extends transversely to the direction said circuit breaker travels as it moves into and out of the compartment 13. The blocking lever 88 is fixed to a shaft 92 which is rotatably mounted in the housing 33 and extends parallel to the drive screw 28. The right-hand ends of the blocking lever 88 and the interlock lever 86 are interconnected by the long link 89 so that each will pivot in the same direction.

A notched interlock rail 94 extends along the floor of the compartment 13 in a direction parallel to the path of the circuit breaker 10. The interlock rail 94 is so proportioned that prior to the movement of the key 39 into the draw-in housing 54, the left end of the interlock lever 86 will engage the outside end of the interlock rail 94, as seen in FIG. 2.

A trip finger 96 extends transversely from the long link 89 at a point intermediate its ends while a bifurcated trip lever 97 is disposed adjacent the long link 89 and has spaced apart arms 98 which embrace the trip finger 96. Thus, downward movement of the long link 89 will bring the trip finger 96 into engagement with the lower arm 98 to thereby pivot the trip lever 97 and open the circuit breaker's main contacts in a manner which will be disclosed hereinbelow.

It can be seen from the foregoing description that before the circuit breaker 10 can be rolled far enough into the compartment 13 for the key 39 to move into the draw-in housing 54, the interlock lever 86 must be rotated through a clockwise angle so that its end 95 clears the end of the interlock rail 94 as indicated by the numeral 95' in FIG. 13. This is accomplished by pushing down on the pedal 100 attached to the blocking lever 88 thereby moving the long link 89 downwardly whereupon the trip finger 96 engages the lower arm 98 of the trip lever 97. It can be seen, therefore, that the draw-in operation of the circuit breaker 10 cannot commence until after the circuit breaker's main contacts have been opened.

After the interlock lever 86 has been rotated in the manner just described, the circuit breaker 10 may be rolled into the compartment 13 until the key 39 moves into the interlock housing 54. When the bearing tip 40 strikes the rear plate 57, the end 95 of interlock lever 86 will have traversed the elevated first portion 102 of the interlock rail 94, as seen in FIG. 2, and be opposite a first slot 103. This is the circuit breaker's test position and unless pedal 100 is depressed, the end 95 of the interlock lever 86 will drop into the slot 103. Further movement of the circuit breaker 10 into the compartment 13 is thereby prevented unless the levers 88 and 86 are again rotated.

The blocking link 88 is provided with a pair of opposed blocking arms 105 and 106 disposed on the opposite sides of the tube 60 surrounding the end of the drive screw 28. In addition, the tube 60 is provided with apertures 108 and 109 for admitting the blocking arms 105 and 106, respectively. When the blocking lever 88 is in its unrotated position as shown in FIGS. 2 and 13, the end of blocking arm 105 is disposed within its aperture 108 and in front of the end 37 of the drive screw 28. It can be seen, therefore, that with the blocking lever 88 in this position the end 62 of the crank 59 cannot be moved into engagement with the end 37 of the drive screw 28 so that a draw-in operation cannot be commenced. In order to move the circuit breaker into its connected position, therefore, pedal 100 must first be depressed to rotate the arm 105 out of the aperture 108 and the end 95 of interlock lever 86 out of the first slot 103. Movement of the circuit breaker toward its connected position by rotation of the drive screw 28 in the manner hereinabove discussed may then commence.

It will be noted that the second blocking arm 106 is disposed outside of the tube 60 when blocking lever 88 is in its unrotated position. When lever 88 is rotated, movement of blocking arm 106 to a point past the aperture 109 is prevented by a key member 110 shown in FIGS. 2, 5 and 11, and which is secured to the opposite end of the shaft 92. When the driving tube 30 is in its fully extended position and the key 39 is down, as shown by phantom lines in FIG. 11, a slot 111 formed in the nut 32 is in register with the end of the key 110 so that the shaft 92 may be fully rotated and the blocking arm 106 moved through its opening 109 and in front of the driving screw 28 to prevent engagement therewith by the crank 59. However, when the draw-in arm 39 is rotated from its phantom position in FIG. 11 to its full position, the nut 32 is also rotated so that the recess 111 is moved away from the key 110 and such full rotation of the shaft 92 is prevented. As the screw 28 begins rotating to draw the circuit breaker 10 into the compartment 13, full rotation of the shaft 92 is prevented because the key 110 strikes the external surface of the driving tube 30. Thus, it can be seen that full rotation of the shaft 92 can be accomplished only when the screw 28 is fully extended and the key 39 is in a position to move into or out of the housing 54.

In order to move the circuit breaker from its test position wherein the end 95 of interlock lever 86 is in the slot 103, the pedal 100 must be depressed thereby tripping the circuit breaker if the same has been closed while in its test position. While blocking lever 88 is rotated, the crank 59 may be engaged with the screw 28 to rotate the draw-in arm 39 from its phantom position shown in FIG. 11 to its full position and then a draw-in operation of the circuit breaker may commence in the manner hereinabove described. It will be appreciated that as the circuit breaker moves, its interrupting contacts cannot be closed because the lower edge of the interlock lever 86 will ride on the upper edge 114 of the interlock rail 94 as indicated at 95″ in FIG. 11 so that the trip finger 96 holds the trip lever 97 in a rotated position. When the driving tube 30 reaches its fully telescoped position as shown in FIG. 5 so that the disconnect contacts 15 are in engagement with the stationary contacts 16, the end 95 of interlock lever 86 will be adjacent the second slot 113 in the interlock rail 94. Removal of the crank 59 will allow the end 95 to fall into slot 113 so that the circuit breaker contacts may be closed and the device be placed in operation. However, movement of the circuit breaker away from its connected position is prevented by reason of the interlock lever 86 engaging the slot 113. Before the crank 59 can be placed in engagement with the screw 28 and the circuit breaker moved out of its connected position, the blocking lever 88 must be rotated to trip the circuit breaker open.

In order to more fully appreciate the functional interrelationship between the interlock and draw-out assemblies which comprise the instant invention and the circuit breaker 10 itself, a circuit breaker operating mechanism for actuating the circuit breaker unit 10 will be discussed in connection with the schematic drawing of FIG. 14. It will be understood that the operating mechanism illustrated in FIG. 14 forms no part of the instant invention and is merely shown as an example and that the draw-out and interlock assemblies are usable with other types of circuit breaker operating mechanisms.

The circuit breaker's main interrupting contacts 128, which are shown in their closed position in FIG. 14, complete a series circuit between the movable disconnect contacts 15. An opening spring 129 tends to move the interrupting contacts 128 toward their open position through a linkage assembly 130 but such movement is prevented by a latch toggle 132 which engages a recess 134 in a vertical link 136 which connects the interrupting contacts 128 to a hydraulic operating mechanism 139. The latch toggle 132 is, in turn, held in rigid condition by a long link 140 whose other end is connected to a latch crank 142. Clockwise rotation of the latch crank 142 about its pivot point 143 under the influence of the opening spring 129 is prevented by reason of the engagement of its other end by a latch tip 144 carried by the latch arm 97.

Open of the circuit breaker assembly is accomplished by energizing a solenoid 147 to rotate trip lever 97 in a counterclockwise direction against the influence of a spring 148 to release the latch crank 142. With the latch crank 142 thus released, the opening spring 129 is free to move the stem 150 which connects it to the linkage 130, to the right, as viewed in FIG. 14 thereby rotating the crank 152 of linkage 130 about a fixed pivot point 153 which, in turn, moves the interrupting contacts 128 toward their open position through the agency of an arm 154. This also moves the link 136 upwardly to collapse the latch toggle 132 and move its knee pin 156 and the link 140 downward and to the left to rotate the latch crank 142 and compress a reset spring 158.

As the toggle 132 collapses, the tip of toggle element 159 moves out of the recess 134 so that the reset spring 158 is free to rotate the latch crank 142 counterclockwise and thereby reset it under the latch tip 144. This also moves the link 140 and the knee pin 156 upward and to the right, thereby resetting the toggle 132 in preparation for a latching operation of the main interrupting contacts 128.

The hydraulic operating mechanism 139 is disposed in a metallic block 160 which is surrounded by a housing 161 to provide a sump 162 for receiving hydraulic operating fluid, such as oil. The mechanism 139 is powered by a hydraulic accumulator 164 to which high pressure fluid is supplied by a motor driven pump 165. The accumulator 164 is connected by a conduit 166 to a relay cylinder 167 through a relay valve 168 which is urged toward its seat 169 by a spring 170, as well as the pressure in the conduit 166. A second conduit 172 connects the relay cylinder 167 to the upper end of an operating cylinder 173 in which an operating piston 174 is reciprocally disposed and which is mechanically connected to the lower end of the link 136. The lower end of the cylinder 173 vents to the sump through an aperture 197. The left end of the relay cylinder 167 is enlarged for receiving a free floating relay piston 177 having a central bore 178 for slidably receiving the stem 179 of the relay valve 168. The right end of the relay piston 177 is reduced and forms with the cylinder 167 a recess 180 which is connected by a relief port 182 to the sump 162.

The flow of fluid to the relay piston 177 is regulated by a pilot valve 183 and a latch valve 184. The pilot valve 183 includes a valve member 185 disposed in a lower valve chamber 186 and having conical lower and upper faces 187 and 188, respectively. In addition, the element 185 is connected by a stem 190 to a closing solenoid 191. A spring 192 urges the lower face 187 of the valve member 185 against a lower seat 189 to seal the chamber 186 from an auxiliary supply conduit 193 which is in communication with the main supply conduit 166. An upper pilot valve chamber 194, opening into the lower chamber 186 and having a smaller diameter, is connected by a conduit 195 to a port 199 opening into the lower end of the operating cylinder 173.

The latch valve 184 includes a piston 196 disposed in a cylinder 198 and connected at its upper end to the latch crank 142 by a link 200. The upper end of the cylinder 198 has a recess 201 which is connected by a relief conduit 202 to the sump 162. The conduit 203 also places the cylinder 198 in communication with the chamber 186. In addition, the lower end of the cylinder 198 is connected by a conduit 204 to the left end of the relay cylinder 167.

Operation of the hydraulic control mechanism to effect closing of the main interrupting contacts 128 will now be discussed with reference to FIG. 14. The pilot valve 183 is normally held against the lower seat 189 by the spring 192. When a closing signal energizes the solenoid 191, the pilot valve 183 is moved upwardly against the influence of the spring 192 and against the upper seat 210 separating chambers 186 and 194. Because substantially the entire upper face 188 of element 185 is exposed to sump pressure through the conduit 195 while the lower surface 187 is exposed to the full accumulator pressure, the element 185 is held against the seat 210 in opposition to the spring 192 even after the opening signal to the solenoid 191 has terminated.

The opening of pilot valve 183 provides high pressure fluid to the left end of the relay cylinder 167 through conduits 195, 203 and 204. This drives the relay piston 177 to the right until its reduced portion enters the small diameter portion of cylinder 167, thereby isolating it from the relief port 182. As piston 177 continues to move toward the right, it picks up the stem 179 of the valve 168 and moves it away from its seat 169 and against the spring 170 thereby connecting the cylinder 173 to the high pressure source 164 through conduits 166 and 172. The operating piston 174 is thereby driven toward the lower end of the cylinder 173 as the fluid below it exhausts to the sump 162 through the port 197. The link 136 is thus moved vertically downward rotating the bell crank 152 counterclockwise to compress the opening spring 129 and reclose the main interrupting contacts 128.

When the piston 174 reaches its lowermost position in cylinder 173 it closes the port 199 so that the pressure in the upper pilot valve chamber can begin building up through a restricted passage 212 which connects the conduit 195 to the lower chamber 186. After a short interval, the spring 192 is able to reclose the pilot valve 183 against the lower seat 189 thereby cutting off pilot pressure to the left side of the cylinder 167 which slowly vents to the sump by leakage past the piston 177. The pressure within the cylinder 167 is thereby able to overcome the pressure on the left side of piston 177 so that the latter begins moving toward the left. This allows the spring 170 to close the relay valve 168 and thereby isolate the cylinder 174 from the high pressure source 164. Further movement of piston 179 to the left opens the chamber 167 into the recess 180 so that the pressure in the upper end of the chamber 173 can exhaust into the sump 162 through the port 182. The opening spring 129 is then free to move the stem 150 slightly to the right until the recess 134 in link 136 picks up the latch toggle element 159 so that the mechanism is mechanically latched in its closed position.

It will be noted that during the entire closing operation pilot pressure acts on the underside of the latch valve piston 196 urging it upwardly. Such upward movement, however, is normally prevented by the engagement of the latch tip 144 by the latch crank 142 since, it will be recalled, crank 142 is normally relatched immediately after an opening operation has commenced. As a result, if a tripping signal is received during any portion of the closing operation just described, solenoid 147 will rotate the latch arm 97 counterclockwise to release the latch crank 142 so that the latch valve piston 196 may be moved upwardly against the reset spring 158 by the pilot pressure acting beneath it. When the lower end of the latch valve piston 196 moves into the recess 201, the cylinder 198 will be vented to the sump 162 through the conduit 202. This loss of pilot pressure allows the pressure acting on the right end of the relay piston 177 to drive it to the left whereby relay valve 168 is reclosed and the upper end of the chamber 173 is vented to the sump through the port 182. The opening spring 129 is then free to drive the partially closed contacts 128 to their fully open position.

A more complete description of the hydraulic operating mechanism 139 appears in copending application Ser. No. 101,577, filed April 7, 1961, now Patent No. 3,073,924 and assigned to the assignee of the instant invention.

In order to operate the circuit breaker independently of the automatic control just described, a maintenance valve 214 is provided. In addition, an interlock assembly 216 is provided to connect the maintenance valve 214 to the draw-out mechanism 17 so that operation of the maintenance valve is prevented when the circuit breaker's main interrupting contacts 128 are closed.

The maintenance valve assembly 214 includes a valve member 218 adapted to cooperatively engage a valve seat 219 formed in the conduit 172 between the operating cylinder 173 and the relay cylinder 167. The valve element 218 is carried on the lower end of an elongate stem 20 which extends through a bore 221 formed in an extension 222 of the block 160. The push button 223 is threadably mounted on a head 224 which is slidably received on the stem 220 and which is held thereon by a washer 226 affixed to the upper end of said stem. A bushing 227 integral with the extension 222 telescopically receives the push button 223 and encases a reset spring 228 circumjacent the upper end of the sleeve 225 and engages the lower end of the push button 223 to bias valve element 218 upwardly and away from the seat 219.

In order to prevent operation of the maintenance valve, except when the circuit breaker is in its test position or fully removed from the compartment 13, a maintenance arm 236 is provided on the interlock lever 86. As seen in FIGS. 13 and 14, the maintenance arm 236 extends normally of the stem 222 and through a slot 238 in the base of the bushing 227. The stem 220 is reduced intermediate its ends to form a neck 230 that is disposed adjacent the end of the maintenance arm 236 when the valve element 218 is in its open position. It can be seen, therefore, that depression of the push button 223 to close the maintenance valve 218 is prevented by engagement between the upper end of the neck 230 and the edge of maintenance arm 236. To close the maintenance valve 218, therefore, the maintenance arm 236 must be moved to a point where it no longer interferes with the stem 220. However, the edge of the maintenance arm 236 is so proportioned that even when the interlock lever 86 is rotated to a position where its ends are out of the slots 103 or 113 it will be in the position 236' shown in FIG. 13 so that the stem 220 is still blocked. To free the stem 220, it is necessary, therefore, to move the maintenance arm to its position 236'' in FIG. 13 by fully rotating the blocking lever 88. It will be recalled from the foregoing, however, that this is possible only when the circuit breaker is in its test position and the draw-in arm 39 is down so that the key 110 can move into the slot 111 on the nut 32 as seen in FIG. 11.

After the push button 223 has been depressed to move the element 218 onto its seat 219 and to depress the reset spring 228, the maintenance arm 236 cannot be released because of its interference with the sleeve 225 extending integrally downward from the head 224. Further depression of push button 223, however, compresses a second spring 231 thereunder to move the waist 232 of sleeve 225 into the path of the maintenance arm 236. The maintenance arm 236 is then free to return to its initial position wherein its engagement with the waist 232 of sleeve 225 holds the valve 218 firmly locked in its closed position. The circuit breaker may then be operated at a controlled rate of speed by opening of valve 233 in a by-pass conduit 234 between the main supply conduit 166 and the cylinder supply conduit 172. By controlling the pressure above piston 174 in this manner, the device may either be closed at a controlled rate of speed or stopped midway between its opened and closed position for maintenance purposes. A second valve 237 disposed between conduit 234 and the sump 162, is provided to vent the upper end of the cylinder 173 during such maintenance operations. In order to reopen the valve 218, it is first necessary to trip the circuit breaker, if it is not already opened, by first depressing the push button 223 to slightly compress the spring 231 and then rotate the interlock lever 86 to move the maintenance arm 236 out of engagement with the waist portion 232 of sleeve 225. This, of course, will trip the circuit breaker open. It will be appreciated, too, that the latter operation can be performed only when the circuit breaker is in its test position or out of the compartment 13. If the circuit breaker were not tripped prior to the opening of valve 218, the movement of piston 174 toward the upper end of cylinder 173 would raise the pressure within conduit 172 to the point where said valve would be held closed hydraulically against the action of spring 228.

While only a single embodiment of the instant invention has been shown and described, it is not intended that the invention be limited thereto, but only by the scope of the appended claims.

I claim:

1. In draw-out type switchgear, the combination of, an enclosure, a horizontally movable circuit breaker unit, draw-out means for moving said circuit breaker unit inwardly and outwardly of said enclosure, said draw-out means including a first means rotatably mounted on said circuit breaker unit about a longitudinal axis, drive means cooperatively engaging said first means for reversible, uniformly advancing movement longitudinally therealong as said first means rotates, said enclosure including a first coupling means, said drive means including second coupling means on one end thereof, releasably connectable to said first coupling means so that said circuit breaker unit is forced outwardly of said enclosure as said drive means moves toward one extremity of said first means and is drawn inwardly of said enclosure upon movement of said drive means toward the other extremity thereof, rotation of said first means in one direction when said drive means reaches said one extremity on said first means being operable to move said second coupling means out of coupling engagement with said first coupling means, said first coupling means being operable upon rotation in an opposite direction to reconnect said first and second coupling means and to move said drive means toward the other extremity of said first means.

2. In draw-out type switchgear, the combination of, a housing, a horizontally movable circuit breaker unit, draw-out means for moving said circuit breaker unit inwardly and outwardly of said housing, said draw-out means including a first means rotatably mounted on said circuit breaker unit about a longitudinal axis, a second means cooperatively engaging said first means for reversible, uniformly advancing movement longitudinally therealong as said first means rotates, said second means including drive means releasably connectable to said housing so that said circuit breaker unit is forced outwardly of said housing as said second means moves toward one extremity of said first means and drawn inwardly said housing upon movement toward the other extremity, lock means normally preventing the rotation of said drive means as said second means moves, means for rendering said lock means ineffective to prevent rotation of said drive means and for coupling said drive means to said first means for rotation therewith in a first direction when said second means reaches said one extremity on said first means to uncouple said drive means from said housing, rotation of said first means in an opposite direction being operative to recouple said drive means to said housing and to move said second means toward the other extremity of said first means.

3. In a draw-out type switchgear, the combination of, a housing, a circuit breaker unit, draw-out means for moving said circuit breaker unit inwardly and outwardly of said housing, said draw-out means including screw means rotatably mounted on said circuit breaker unit, a nut threadably mounted on said screw means for longitudinal movement therealong as said screw means rotates, drive means secured at one end to said nut and movable relative to said screw means as said nut moves longitudinally therealong, key means mounted on the other end of said drive means, fixed means mounted within said housing and operatively engageable by said key means, so that said circuit breaker unit will be drawn inwardly of said housing upon rotation of said screw means in a first direction and moved outwardly thereof upon rotation of said screw means in an opposite direction, guide means mounted on said circuit breaker unit and extending in a direction parallel to said screw means, lock means for coupling said drive means to said guide means to prevent the rotation of said drive means as it moves longitudinally of said screw means, said lock means freeing said drive means for limited rotation when said lock means reaches the terminus of said guide means and said drive means is fully extended, means for releasing said drive means to said screw means when said lock means passes the terminus of said guide means so that said key means may be rotated into operative engagement with said fixed means upon rotation of said screw means in said first direction and out of said engagement upon rotation thereof in said opposite direction.

4. In a draw-out type switchgear, the combination of, a housing, a circuit breaker unit, draw-out means for moving said circuit breaker unit inwardly and outwardly of said housing, said draw-out means including screw means rotatably mounted on said circuit breaker unit, threaded means mounted on said screw means for longitudinal movement therealong as said screw means rotates, drive tube means secured at one end to said threaded means and telescopically movable relative to said screw means as said threaded means moves, key means mounted on the other end of said tube means, fixed means mounted on the rear of said housing and operatively engageable by said key means to affix said drive tube means to the rear of said housing so that rotation of said screw means in a first direction will move said circuit breaker unit inwardly and rotation thereof in the opposite direction will move said unit outwardly, track means mounted on said circuit breaker unit, said track means extending in a direction parallel to said screw means and for substantially its entire length, lock means coupled to said drive tube means for rotation therewith, said lock means engaging said track means to normally prevent the rotation of said tube means, said tube means being free for limited rotation when said lock means reaches the terminus of said track means and said tube means is fully extended, coupling means for releasably connecting said lock means to said screw means when said lock means passes the terminus of said track means so that said key means may be rotated into operative engagement with said fixed means upon rotation of said screw means in said other direction and out of said engagement upon rotation thereof in said first direction.

5. In draw-out type switchgear, the combination of, a housing, a circuit breaker unit having main interrupting contacts, extendable draw-out means for moving said circuit breaker unit inwardly and outwardly of said housing, said draw-out means including fixed means disposed within said housing and key means mounted on said circuit breaker unit, means for moving said key means between first and alternate angular positions when said draw-out means is in an extended position and said circuit breaker unit is outwardly of said housing, said key means being operatively engageable with said fixed means when in its first angular position, rotation of said key means to its alternate angular position after its operative engagement with said fixed means being operative for preventing the uncoupling of said key means from said fixed means, said key means being movable relative to said circuit breaker unit when it is in its alternate position so that said unit will be moved inwardly of said housing, means for rendering said draw-out means inoperative to produce such relative movement when said key means is in its first angular position.

6. A circuit breaker operating mechanism including main switch means having open and closed positions, switch opening means, hydraulic operating means including a piston for closing said switch means, a source of hydraulic pressure, hydraulic control means for selectively coupling said piston to said source to initiate a closing operation of said switch means, manually operable valve means for isolating said piston from said source independently of said control means, biasing means urging said valve means toward its open position, and interlock means coupled to said switch opening means for preventing the movement of said valve means into or out of its closed position when said switch means is in its closed position, and selectively operable valve means for connecting said piston to said pressure source independently of said control means and said manually operable valve means.

7. A circuit breaker operating mechanism including biasing means urging said mechanism toward an open position and latch means for holding said mechanism in a closed position in opposition to said biasing means, electroresponsive means for releasing said latch means, hydraulic operating means for closing said mechanism against the action of said biasing means, a source of hydraulic pressure, hydraulic control means for selectively coupling said operating means to said source to initiate a closing operation of said mechanism, manually operable valve means for isolating the operating means from said source independently of said control means, spring means urging said valve means toward its open position, and interlock means coupled to said latch means for preventing movement of said valve means into or out of its closed position when said circuit breaker mechanism is in its closed position, said interlock means also being operable to hold said valve means closed in opposition to said spring means.

8. In draw-out switchgear, an enclosure, a circuit breaker unit including main switch means, switch opening means coupled to said main switch means, fluid operating means for closing said switch means, a source of fluid pressure, control means for selectively coupling said operating means to said source to initiate a closing operation of said switch means, manually operable valve means having a closed position for isolating said operating means from said source independently of said control means, interlock means operatively associated with said valve means and coupled to said switch opening means for preventing the movement of said valve means into or out of its closed position when said switch means is in its closed position, and draw-out means for moving said circuit breaker unit between first and second positions relative to said enclosure, operating means releasably engageable with said draw-out means for initiating the operation thereof, said interlock means also preventing the engagement of said operating means and said draw-out means when said valve means is in its closed position, said selectively operable valve means for connecting said operating means to said pressure source independently of said control means and said manually operable valve means.

9. In draw-out switchgear, an enclosure, a circuit breaker unit including main switch means, switch opening means coupled to said main switch means, fluid operating means for closing said main switch means, a source of fluid pressure, control means for selectively coupling said operating means to said source to initiate a closing operation of said main switch means, manually operable valve means having a closed position for isolating said operating means from said source independently of said control means, interlock means coupled to said switch opening means for preventing the movement of said valve means into or out of its closed position when said main switch means is in its closed position, and draw-out means for moving said circuit breaker unit between first and second positions relative to said enclosure, said interlock means also preventing the closure of said valve means when said circuit breaker unit is out of its second position, and selectively operable valve means for connecting said operating means to said pressure source independently of said control means and said manually operable valve means.

10. In draw-out type switchgear, the combination of, a housing, stationary disconnect contacts mounted in the rear of said housing, a circuit breaker unit having movable disconnect contacts and main interrupting contacts, opening means for said main interrupting contacts, draw-out means for moving said circuit breaker unit between first and second positions relative to said stationary disconnect contacts, a selectively removable operating member for engaging said draw-out means and initiating a drawout operation, a first interlock means connected to said opening means and having a first position for preventing the engagement of said operating member with said draw-out means when said main interrupting contacts are closed and a second position for opening said main interrupting contacts and for preventing the closure thereof when said operating member and said draw-out means are in engagement, and a second interlock means for preventing the closure of said main interrupting contacts independently of said operating member when said circuit breaker unit is between said positions and for holding said first interlock means in its second position.

11. In draw-out type switchgear, the combination of, a housing, stationary disconnect contacts mounted in said housing, a circuit breaker unit having movable disconnect contacts and main interrupting contacts, draw-out means for moving said circuit breaker unit between first and second positions relative to said stationary disconnect contacts, an operating member, said draw-out means being releasably engageable by said operating member so that said draw-out means may be actuated, first interlock means connected to said interrupting contacts and having first position normally preventing the engagement of said operating member with said draw-out means, said first interlock means being movable to an alternate position wherein it is ineffective to prevent such engagement, said first interlock means being operative upon movement out of its first position to open said main interrupting contacts, and second interlock means for holding said first interlock means in its alternate position when said circuit breaker unit is between said first and second positions.

12. In draw-out type switchgear, the combination of, a housing, stationary disconnect contacts mounted in said housing, a circuit breaker unit having movable disconnect contacts and main switch means biased toward an open position, latch means for holding said main switch means closed, latch release means, draw-out means for moving said circuit breaker unit between first and second positions relative to said housing, a first interlock lever connected to said main switch means and having a first position for normally preventing the operation of said draw-out means, said first interlock lever being movable to an alternate position wherein it is ineffective to prevent such operation, said first interlock lever being operative upon movement out of its normal position to actuate said latch release means and prevent the reclosure of said main switch means, a second interlock lever connected to said first interlock lever, and track means disposed in said housing and extending parallel to the direction said circuit breaker unit travels, said track means having an elevated portion engageable by said second interlock lever when said circuit breaker unit is between its positions to hold said first lever in its alternate position.

13. In draw-out type switchgear, the combination of, a housing, stationary disconnect contacts disposed within said housing, shutter means operable to isolate said stationary disconnect contacts, a circuit breaker unit mounted for movement into and out of said housing and having movable disconnect contacts, draw-out means for moving said circuit breaker unit between first and second positions relative to said housing, said draw-out means including a first means rotatably mounted on said circuit breaker unit, second means cooperatively engaging said first means for reversible, uniformly advancing movement as said first means rotates, said second means including drive means releasably connectable to said housing so that said circuit breaker unit is moved toward one of said positions as said drive means moves towards one extremity of said first means and toward the other of said positions upon movement of said drive means toward the other extremity thereof, lock means normally preventing the rotation of said drive means as said second means moves, means for rendering said lock means ineffective to prevent rotation of said drive means and for coupling said drive means to said first means for rotation therewith in a first direction when said second means reaches said one extremity on said first means to uncouple said drive means from said housing, rotation of said first means in an opposite direction being operative to recouple said drive means to said housing and to move said second means toward the other extremity of said first means, and interlock means coupling said shutter means to said drive means to open said shutter means upon the engagement of said drive means with said housing and to close the same upon the disengagement of said drive means and said housing.

14. In draw-out type switchgear, the combination of, an enclosure having fixed means therein, stationary disconnect contacts disposed within said enclosure, shutter means operable to isolate said stationary disconnect contacts, a circuit breaker unit having movable disconnect contacts, draw-out means for moving said circuit breaker unit inwardly and outwardly of said enclosure, said draw-out means including drive means operatively coupled to said circuit breaker unit and reversibly movable relative thereto, said drive means including key means rotatable into operative engagement with said fixed means so that said circuit breaker unit is forced outwardly of said enclosure as said drive means moves in one direction relative to said circuit breaker unit, and is drawn inwardly of said enclosure as said drive means moves in the opposite direction relative thereto, said key means being rotatable out of operative engagement with said fixed means when said circuit breaker unit reaches an outward position relative to said enclosure so that said circuit breaker unit may be removed from said enclosure, interlock means coupled to said key means and to said shutter means for opening said shutter means when said key means rotates into operative engagement with said fixed means and for closing said shutter means when said key means rotates out of operative engagement with said fixed means.

15. In draw-out type switchgear, the combination of, an enclosure, stationary disconnect contacts disposed within said enclosure, shutter means operable to isolate said stationary disconnect contacts, a circuit breaker unit having movable disconnect contacts, draw-out means for moving said circuit breaker unit into and out of said enclosure, said draw-out means including a first means rotatably mounted on said circuit breaker unit, drive means cooperatively engaging said first means for reversible, uniformly advancing movement as said first means rotates, said drive means including key means rotatable into operative engagement with said enclosure so that said circuit unit is forced out of said enclosure as said drive means moves toward one extremity of said first means and is drawn into said enclosure upon movement of said drive means toward the other extremity thereof, said key means being rotatable out of operative engagement with said enclosure upon rotation of said first means in one direction when said drive means reaches said one extremity on said first means, interlock means coupled to said key means and to shutter means for opening said shutter means when said key means rotates into operative engagement with said enclosure and for closing said shutter means when said key means rotates out of operative engagement with said enclosure.

16. In draw-out type switch gear, the combination of, a housing, a horizontally movable circuit breaker unit, draw-out means for moving said circuit breaker unit inwardly and outwardly of said housing, said draw-out means including a first means mounted on said circuit breaker unit and extending in a direction generally parallel to the path of said circuit breaker unit, a second means cooperatively engaging said first means for reversible uniformly advancing movement longitudinally therealong, said second means including drive means releasably connectible to said housing so that said circuit breaker unit is forced inwardly of said housing as said second means moves toward one extremity of said first means and drawn outwardly of said housing upon movement toward the other extremity, lock means normally preventing the rotation of said drive means as said second means moves, means for rendering said lock means ineffective to prevent rotation of said drive means and for rotating said drive means in a first direction when said second means reaches said one extremity of said first means to uncouple said drive means from said housing, rotation of said first means in an opposite direction being operative to recouple said drive means to said housing and to move said second means toward the other extremity of said first means.

17. In a draw-out type switchgear, the combination of, a housing, a circuit breaker unit, draw-out means for moving said circuit breaker unit inwardly and outwardly of said housing, said draw-out means including screw means rotatably mounted on said circuit breaker unit, a nut threadably mounted on said screw means for longitudinal movement therealong as said screw means rotates, drive means secured to said nut and movable therewith relative to said screw means as said nut moves longitudinally therealong, coupling means mounted on the said drive means, fixed means mounted within said housing and operatively engageable by said coupling means so that said circuit breaker unit will be drawn inwardly of said housing upon rotation of said screw means in a first direction and moved outwardly thereof upon rotation of said screw means in an opposite direction, guide means for preventing the rotation of said drive means as it moves longitudinally of said screw means, said guide means being ineffective to prevent rotation of said drive means when said nut reaches one extremity of said screw means and said drive means is fully extended, said coupling means releasably connecting said drive means to said screw means when said nut reaches said one extremity so that said coupling means may be rotated into operative engagement with said fixed means upon rotation of said screw means in said first direction and out of engagement upon rotation thereof in an opposite direction.

18. In a draw-out type switchgear, the combination of, a housing unit and a circuit breaker unit, draw-out means for moving said circuit breaker unit inwardly and outwardly of said housing unit, said draw-out means including screw means rotatably mounted on one of said units, nut means threadably engaging said screw means for longitudinal movement therealong as said screw means rotates, drive means secured to said nut means and movable therewith relative to said screw means, first key means mounted on said drive means, second key means mounted on the other of said units and operatively engageable by said first key means to affix said circuit breaker unit to said housing unit so that rotation of said screw means in a first direction will move said circuit breaker unit inwardly and rotation thereof in the opposite direction will move said circuit breaker unit outwardly, lock means coupled to said drive means to normally prevent the rotation thereof, said drive means being free for limited rotation when said nut means reaches one extremity of said screw means, coupling means for releasably connecting said lock means to said screw means when said lock means reaches said one extremity thereof so that said first key means may be rotated into operative engagement with said second key means upon rotation of said screw means in said other direction and out of engagement upon rotation thereof in said first direction.

References Cited by the Examiner

UNITED STATES PATENTS

| | | | |
|---|---|---|---|
| 1,798,705 | 3/1931 | Rugg et al. | 200—50 |
| 2,273,002 | 2/1942 | Mahoney | 200—50 |
| 2,464,237 | 3/1949 | Kelle | 200—82 |
| 2,716,862 | 11/1952 | Caswell | 200—50 |
| 2,777,024 | 1/1957 | West | 200—50 |
| 2,894,085 | 7/1959 | Wilson | 200—50 |

BERNARD A. GILHEANY, *Primary Examiner.*